United States Patent
Thattamangalam Narayanan

(10) Patent No.: US 9,961,416 B2
(45) Date of Patent: May 1, 2018

(54) METHOD AND APPARATUS FOR SET-TOP-BOX ACTIVATION

(71) Applicant: TECH 5, Issy-les-Moulineaux (FR)

(72) Inventor: Krishnan Thattamangalam Narayanan, Chennai (IN)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days. days.

(21) Appl. No.: 15/335,843

(22) Filed: Oct. 27, 2016

(65) Prior Publication Data

US 2017/0127154 A1 May 4, 2017

Related U.S. Application Data

(60) Provisional application No. 62/247,873, filed on Oct. 29, 2015.

(51) Int. Cl.
*H04N 21/858* (2011.01)
*H04N 21/2362* (2011.01)
*H04N 21/434* (2011.01)
*H04N 21/4223* (2011.01)
*H04N 21/218* (2011.01)
*H04N 21/442* (2011.01)

(52) U.S. Cl.
CPC ... *H04N 21/8586* (2013.01); *H04N 21/21805* (2013.01); *H04N 21/2362* (2013.01); *H04N 21/4223* (2013.01); *H04N 21/4345* (2013.01); *H04N 21/4424* (2013.01)

(58) Field of Classification Search
None
See application file for complete search history.

(56) References Cited

U.S. PATENT DOCUMENTS

| | | | | |
|---|---|---|---|---|
| 6,466,981 B1* | 10/2002 | Levy | | H04L 29/06 709/217 |
| 6,725,303 B1* | 4/2004 | Hoguta | | H04Q 3/0016 709/227 |
| 7,383,229 B2* | 6/2008 | Jacoby | | H04N 7/17318 348/E7.071 |
| 8,967,460 B1* | 3/2015 | Baykal | | G06Q 10/087 235/375 |
| 9,270,702 B2* | 2/2016 | Park | | H04L 63/102 |
| 9,600,101 B2* | 3/2017 | Trenholm-Boyle | .. | G06F 3/0383 |
| 9,641,570 B2* | 5/2017 | Knodt | | H04L 65/403 |

(Continued)

*Primary Examiner* — Jonathan V Lewis
(74) *Attorney, Agent, or Firm* — Jerome G. Schaefer

(57) ABSTRACT

A method performed by a set-top box operating on a network includes generating an indicia containing a media access control address of the set-top box and a first uniform resource locator which is displayed for scanning by a companion device. The set-top-box receives entitlements for activation if the entitlements were previously granted. If the entitlements were not previously granted, the set-top box receives a second uniform resource locator with which it generates an updated indicia which is displayed for scanning by the companion device. The set-top-box then receives entitlements for activation of the set-top box if initiation of the subscription occurs. The set-top box removes the updated indicia from display and uses the entitlements to active the set-top box to receive multimedia content on the network.

19 Claims, 6 Drawing Sheets

(56) References Cited

U.S. PATENT DOCUMENTS

| | | | |
|---|---|---|---|
| 2003/0163542 A1* | 8/2003 | Bulthuis | G08C 19/28 709/208 |
| 2005/0111463 A1* | 5/2005 | Nepomuceno Leung | H04W 92/18 370/395.52 |
| 2012/0217293 A1 | 8/2012 | Martch et al. | |
| 2012/0246667 A1* | 9/2012 | Rothschild | G11B 27/11 725/1 |
| 2013/0110676 A1* | 5/2013 | Kobres | G06Q 20/20 705/26.41 |
| 2013/0151583 A1* | 6/2013 | O'Connor | G06Q 20/34 709/202 |
| 2013/0183934 A1* | 7/2013 | Roemer | H04W 8/265 455/411 |
| 2015/0079982 A1* | 3/2015 | Wu | H04W 4/001 455/435.1 |
| 2015/0195594 A1* | 7/2015 | Hicks | H04N 21/2665 725/25 |
| 2015/0244725 A1* | 8/2015 | Ziskind | H04L 63/101 726/28 |
| 2017/0180349 A1* | 6/2017 | Park | H04L 63/083 |

\* cited by examiner

METHOD AND APPARATUS FOR SET-TOP-BOX ACTIVATION

CROSS REFERENCE TO RELATED APPLICATIONS

This application claims priority to U.S. Provisional Application No. 62/247,873 entitled "Call-Less Activation", filed on 29 Oct. 2015, which is hereby incorporated by reference in its entirety for all purposes.

FIELD

The present disclosure relates to the activation of set top boxes using on-line methods.

BACKGROUND

Cable television systems, satellite television systems, and over the air television systems can use set-top boxes (STB) as an information appliance device to allow a user to access digital content from a digital content provider. Set-top boxes and their related equivalents such as set-top units (STU), Gateways, or digital transport adapters (DTA) can contain an input stage, tuner, digital signal decoding or other digital signal processing modules and can output selected digital content to a display such as a television monitor. Other services such as telephone service may also be accommodated in a gateway or STB.

The input signal source to a STB might be an Ethernet cable, a satellite dish, a coaxial cable, a telephone line, broadband over power lines (BPL), or even an ordinary VHF or UHF antenna. Digital content, in this context, could mean any or all of video, audio, Internet web pages, interactive video games, or other possibilities. Set-top boxes generally require a set-up or an activation with a content provider to allow a user access to the various forms of services and digital content.

Activation of a set-top box has historically involved the use of telephone calls to the content or subscription provider to ensure that the user is entitled to receive the services or digital content. This telephone activation can be slow and frustrating in establishing a new account or renewing a account in a different location if the STB is moved. A more user-friendly method for STB activation is desirable.

SUMMARY

This summary is provided to introduce a selection of concepts in a simplified form as a prelude to the more detailed description that is presented later. The summary is not intended to identify key or essential features of the invention, nor is it intended to delineate the scope of the claimed subject matter.

In one embodiment, a method performed by a set-top box (STB) operating on a first network includes generating an indicia containing a media access control address of the STB and a first uniform resource locator (URL) and driving the indicia to be displayed. The indicia is scanned by an external device to communicate on a second network to obtain entitlements for the STB. The STB receives entitlements for activation of the set-top box via the first network if the entitlements were previously granted. Otherwise, the STB receives a second URL if the entitlements were not previously granted. The second URL is used to generate an updated indicia containing the media access control address of the STB and the second URL. The updated indicia is displayed and the displayed updated indicia is used by the external device on the second network for initiation of a subscription having entitlements used for activation of the set-top box. New entitlements for activation of the STB are received after initiation of the subscription occurs. The STB is then activated using the entitlements to receive multimedia content from the first network.

In one embodiment, a method performed by a set-top box (STB) includes generating an indicia containing a media access control address of the STB and a first uniform resource locator, the STB operating on a first network and outputting the indicia for display. The indicia is scanned by an external device to communicate on a second network to obtain entitlements for the STB. The STB receives a second uniform resource locator if the entitlements were not previously granted. The STB generates an updated indicia containing the media access control address of the STB and the second uniform resource locator. The updated indicia is outputted and is used by the external device on the second network for initiation of a subscription having entitlements used for activation of the STB. Entitlements are then received by the STB via the first network for activation of the STB after initiation of the subscription occurs. The entitlements are used by the STB to receive multimedia content from the first network.

In one embodiment, a method performed by a mobile device, includes scanning an indicia being displayed on a display device. Data is extracted from the indicia, the extracted data including a first uniform resource locator and a media access controller address of associated with a set-top box. The mobile device communicates across a mobile network using the extracted data. If the set-top box cannot acquire entitlements over an internet protocol network based on the communication of the mobile device, the mobile device scans an updated indicia displayed on the display device and extracts updated data from the updated indicia, the extracted updated data including a second uniform resource locator and a media access controller address of the set-top box. The mobile device communicates across the mobile network using the extracted updated data and receives a subscriber form for multimedia content, the subscriber form to be populated with subscriber information. The populated subscriber form is transmitted across the mobile network to the second uniform resource locator address. Then, the set-top box is supplied with entitlements via the internet protocol network based on the populated subscriber form transmitted over the mobile network.

In one embodiment, an STB apparatus includes a processor that generates an indicia containing a media access control address of the apparatus and a first uniform resource locator, and an interface to output the indicia to be displayed, wherein the indicia is scanned by an external device to communicate on a second network to obtain entitlements for the set-top box if entitlements were previously granted. The STB apparatus includes a network transceiver to receive a second uniform resource locator if the entitlements were not previously granted. The processor generates an updated indicia containing the media access control address of the apparatus and the second uniform resource locator. The interface outputs the updated indicia to be displayed, wherein the updated indicia is used by the external device on the second network for initiation of a subscription having entitlements used for activation of the set-top box. The network transceiver receives entitlements for activation of the set-top box after initiation of the subscription occurs, and the processor activates the STB apparatus using the entitlements to receive multimedia content from the first network.

In one embodiment, a mobile apparatus includes a camera for scanning an indicia being displayed on a display device, a processor for extracting data from the indicia, the extracted data including a first uniform resource locator and a media access controller address associated with a set-top box, and a transceiver for communicating across the mobile network using the extracted data. The processor determines if the set-top box cannot acquire entitlements over an internet protocol network based on the extracted data. The camera scans an updated indicia displayed on the display device. The processor extracts updated data from the updated indicia, the extracted updated data including a second uniform resource locator and a media access controller address of the set-top box. The transceiver communicating across the mobile network using the extracted updated data and receives a subscriber form for multimedia content, the subscriber form to be populated with subscriber information. The transceiver transmits the populated subscriber form across the mobile network to the second uniform resource locator address, wherein the set-top box is supplied with entitlements via the internet protocol network based on the populated subscriber form transmitted over the mobile network.

Additional features and advantages of the invention will be made apparent from the following detailed description of illustrative embodiments which proceeds with reference to the accompanying figures. The drawings are for purposes of illustrating the concepts of the disclosure and are not necessarily the only possible configuration for illustrating the disclosure.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention. In the drawings, like numbers represent similar elements.

DETAILED DISCUSSION OF THE EMBODIMENTS

Figure 1:
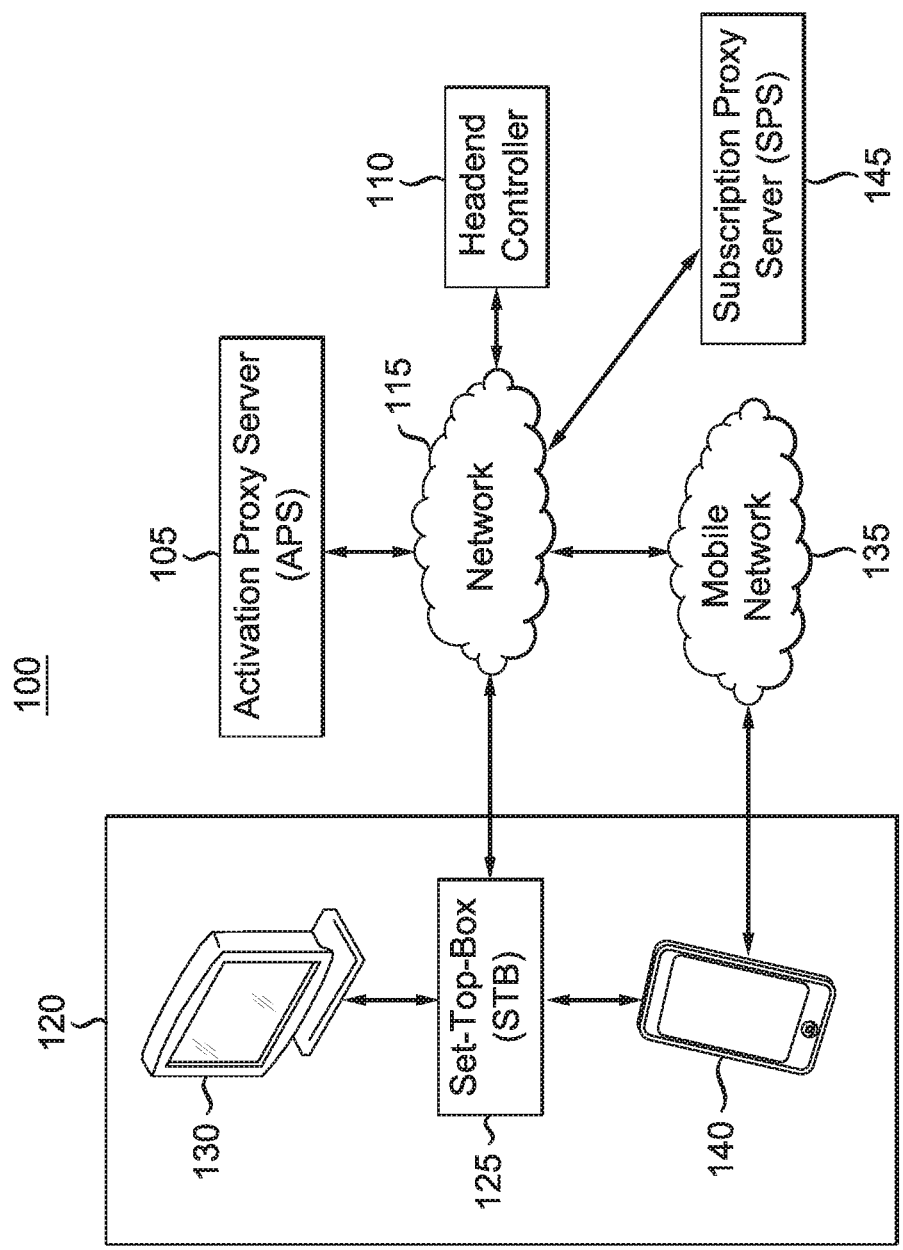
FIG. 1 shows an operating environment for the disclosed configuration.

In the following description of various illustrative embodiments, reference is made to the accompanying drawings, which form a part thereof, and in which is shown, by way of illustration, how various embodiments in the inventive configuration may be practiced. It is to be understood that other embodiments may be utilized and structural and functional modifications may be made without departing from the scope of the inventive configuration.

A set-top-box (STB) may include a device that may contain a TV-tuner input and displays output to a television set. The STB may receive a signal from a headend and convert the signal into content in a form that can be displayed on a television screen or other display device. The STB may be used in cable television, satellite television, and over-the-air television systems for example. While the STB may receive the signal from the headend, the STB (or other one-way DTA, STU, or Gateway for example) may not have reverse path connection to the headend.

A user may install the STB in their home, for example, to receive cable television or other services. When installing the STB, the user may connect the STB to a content delivery system (e.g., a cable television system in their home). Once connected and power up, the STB may perform a code download if there has been an upgrade in software. Then the STB may present an activation support message (ASM) on a display device (e.g., a television screen) with a phone number to call an operator of the content delivery system.

When the consumer calls, the operator may manually trigger the headend to send entitlements to the STB. These entitlements are setup specific to each user at the headend after he/she purchases a digital data package from the content provider. The entitlements allow the user to access the purchased or subscribed to digital products and services. The entitlements may take multiple forms such as specific codes associated with account numbers. Such entitlements may, in some embodiments, be encrypted to avoid piracy of content.

In one scenario, the STB may become activated on receiving the entitlements thus enabling the user to view digital content. In some forms, the entitlements may include messages corresponding to the packages subscribed to by the user and may have been previously setup at the headend at the time, for example, when the user purchased the or leased the STB. Even though it may have been setup earlier, because the STB was not connected to the content delivery system earlier, the entitlements may need to be re-sent when the STB is connected to the content delivery system by the user. This may occur when moving the STB from one location to another. A re-send of entitlements may also occur when the STB does not have a reverse path connection to the headend to pull entitlements. Consistent with embodiments of the disclosure, the call to the system operator may be avoided in resending the entitlements when the STB is connected to the content delivery system if aspects of the current disclosure are employed.

FIG. 1 is a block diagram of an operating environment 100. As shown in FIG. 1, operating environment 100 may include an activation proxy server (APS) 105, a headend controller 110, a subscription proxy server (SPS) 145, a network 115, and customer premises equipment (CPE) 120. Headend controller 110 may receive television signals and distribute them over network 115 to CPE 120. In addition, headend controller 110 may distribute on-demand content as well as simulcast and unicast content to CPE 120. Network 115 may be an internet protocol (IP) network but may include any type of network capable of communicating data comprising, for example, video and audio content. For example, network 115 may include a local area network (LAN) or wide area network (WAN) such as the Internet. APS 105, SPS 145, network 115, and headend controller 110 may include or be used in conjunction with the content delivery system operated by the operator.

CPE 120 may include any device or devices capable of receiving and displaying content. As shown in FIG. 1, CPE 120 may include a STB 125, a display 130, and a companion device 140. STB 125 may include, but is not limited to, a set-top box, a digital video recorder, a cable modem, gateway, digital transport adaptor, or a personal computer. Display 130 may include, for example, a high definition television, a flat screen display device, or the display of another computing device such as a desk top personal computer, a tablet device, or a mobile device.

STB 125 may be used to receive content over network 115 from APS 105 or from headend controller 110. The received content may include simulcast and unicast television content as well as on demand content. The aforementioned are examples and the received content may include any type of content. Once the content has been received, STB 125 may cause the content to be displayed on display 130. After the content is displayed on display 130, a remote control may be used, for example, to allow the user to select desired content, to interact with the displayed content, or to cause display 130 to perform a desired function.

Companion device 140 may include, but is not limited to, a mobile device, a tablet device, a smart phone, a telephone, or a personal computer. The aforementioned are examples and companion device 140 may include any type of computing device. A camera may be utilized by companion device 140. The camera may be built-in to companion device 140 or it may be external. Companion device 140 may capture images using the camera for processing as described in greater detail below. Moreover, companion device 140 can interface with APS 105 and SPS 145 over network 115. Note that in one embodiment, the companion device communicates on a different network than that of the STB. For example, if the companion device is a cell phone, the cell phone may use an RF connection to a cellular network 135 shown in FIG. 1. The cellular network 135, such as a mobile network may then bridge over so that communication with the network 115 is made. Thus, two networks may be involved in the configuration of FIG. 1; a first network which connects to the set-top-box and a second network which connects directly with the companion device. The first network 115 may be an IP network, the second network 135 may be a cellular or mobile network. An example mobile network may be a WiFi network or a peer-to peer-network. A cellular network may be one that is provided by a cell phone carrier for the purpose of transporting voice and data transmissions.

Figure 2:
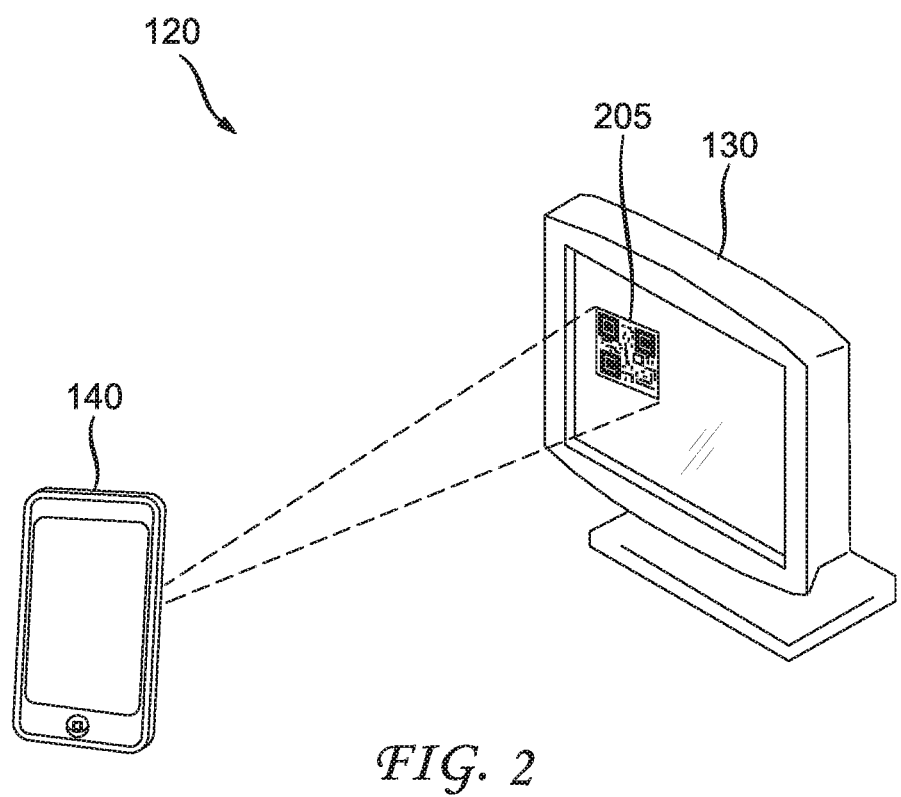
FIG. 2 shows customer service equipment used in an embodiment.

FIG. 2 shows aspects of CPE 120 in more detail. As shown in FIG. 2, content may be displayed on display 130. The displayed content may include an indicia 205. Consistent with embodiments of the disclosure, companion device 140 may be used to capture an image of the displayed content including indicia 205. Indicia 205 may include an optical, machine-readable representation of data. For example, indicia 205 may include a one-dimensional bar code, a two-dimensional bar code, a MaxiCode, or a high capacity color barcode. The aforementioned are examples and indicia 205 may include any type of optical, machine-readable data representation.

In addition, indicia 205 may include a quick response (QR) code. A QR code is a type of matrix barcode (or two-dimensional barcode) and uses four standardized encoding modes (numeric, alphanumeric, byte/binary, and kanji) to store data; extensions may also be used. A QR code includes black modules (square dots) arranged in a square grid on a white background that can be read by an imaging device (e.g., a camera, scanner, etc.) and processed using, for example, Reed-Solomon error correction until the image can be appropriately interpreted. The data may then be extracted from patterns that are present in both horizontal and vertical components of the image.

Figure 3:
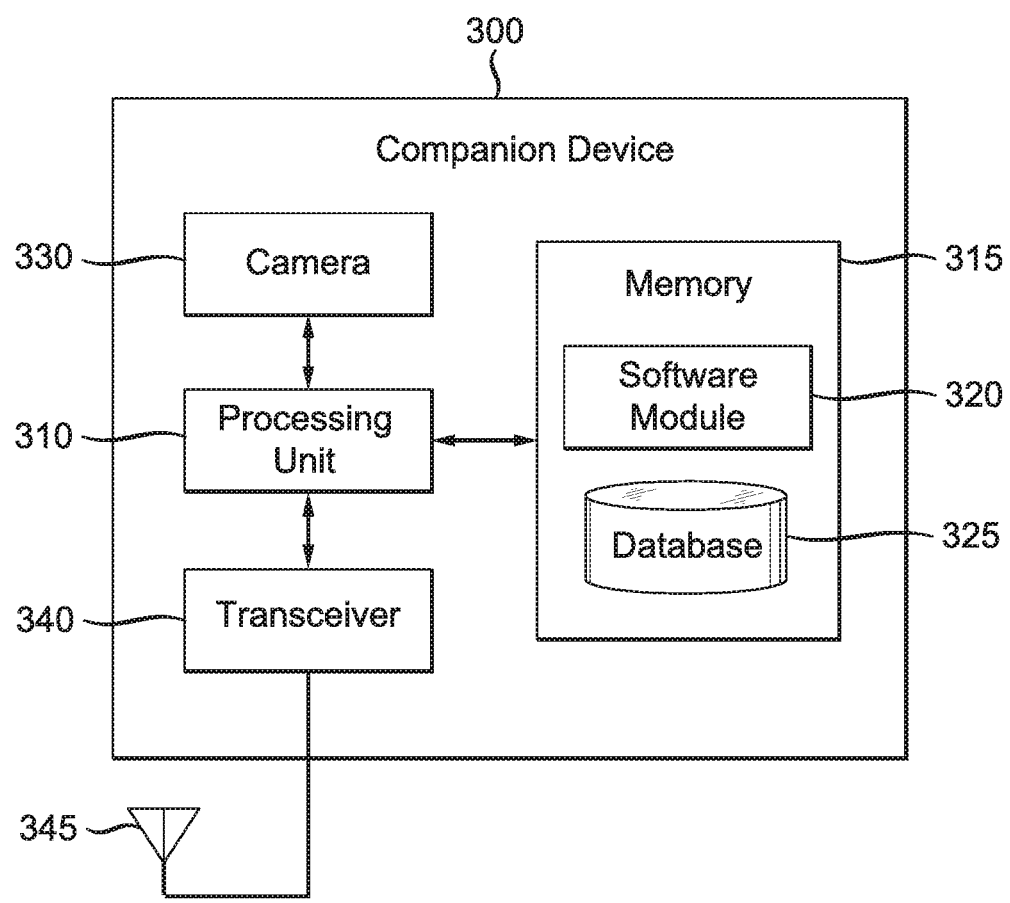
FIG. 3 shows a companion device architecture used in an embodiment.

FIG. 3 shows a companion device 300 in more detail. Companion device 300 includes many of the basic features of a computing device such as a processing unit and memory. Other computing devices that are used in the environment of FIG. 1 include, for example, for APS 105, SPS 145, headend controller 110, STB 125, or companion device 140. Specifically, as shown in FIG. 3, companion device 300 may include a processing unit 310 and a memory unit 315. Memory unit 315 may include a software module 320 (e.g., an application) and a database 325. In addition, companion device 140 may include a camera 330 that may capture images and store them in database 325 under the control of processing unit 310. Transceiver 340 transmits, via antenna 345, information concerning scanned images from the camera to a cellular network. Transceiver 340 can also transmit and receive information useful to provide subscription information to agents on the network 115 via the cellular network 135. While executing on processing unit 310, software module 320 may perform processes for providing call-less activation, including for example, one or more stages from method 400 described below with respect to FIG. 4.

Companion device 140 may be implemented using a tablet device, a mobile device, a smart phone, a telephone, a remote control device, a set-top box, a digital video recorder, a cable modem, a personal computer, a network computer, a mainframe, or other similar microcomputer-based device. The processor may include any computer operating environment, such as hand-held devices, multi-processor systems, microprocessor-based or programmable sender electronic devices, minicomputers, mainframe computers, and the like. The processor may also be practiced in distributed computing environments where tasks are performed by remote processing devices. Furthermore, the processor may include, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand-held computer, a conventional telephone, or a Wireless Fidelity (Wi-Fi) access point. The aforementioned systems and devices are examples and the processor may include other systems or devices.

Figure 4:
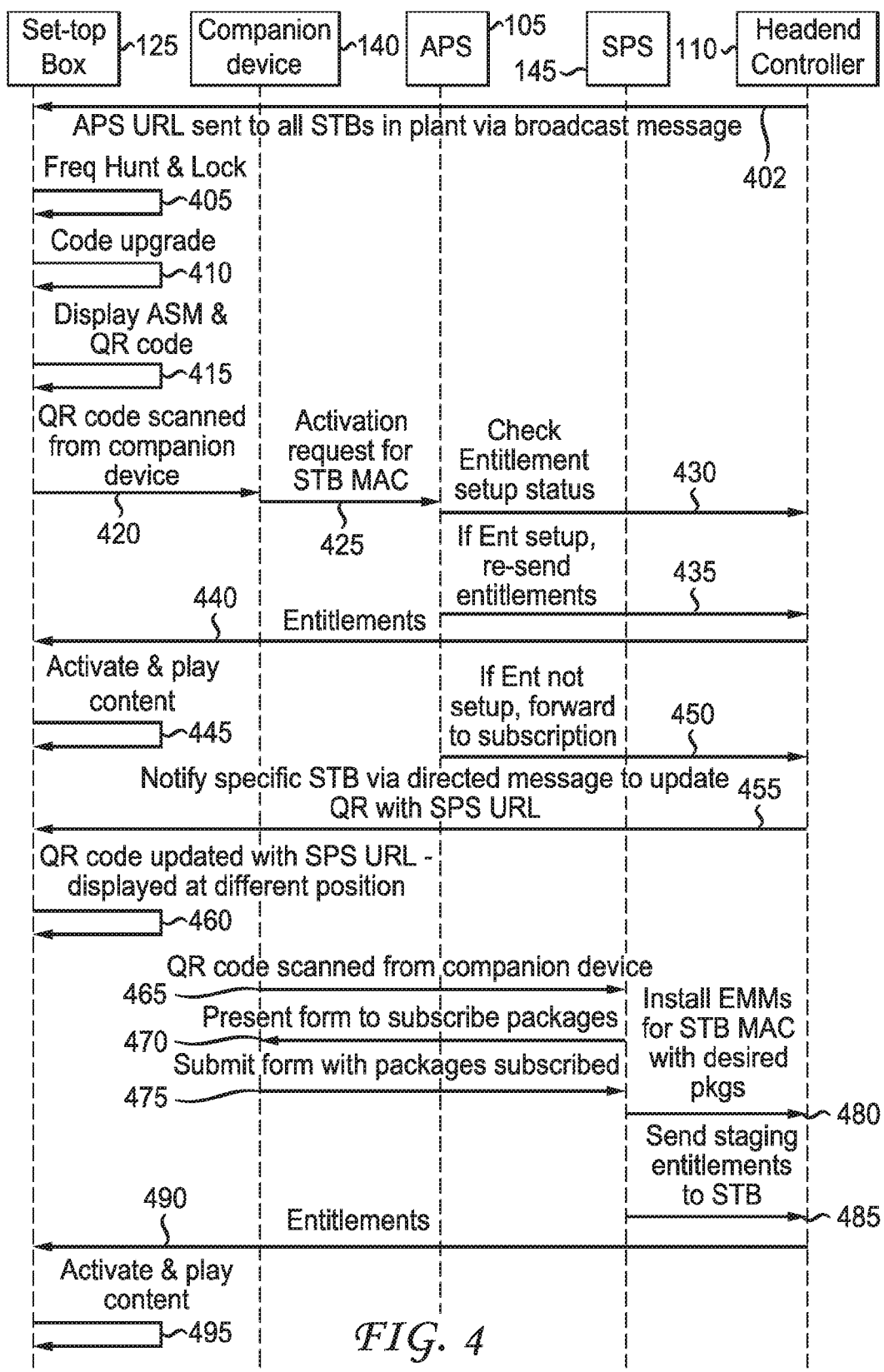
FIG. 4 is a communication event diagram of a method for providing STB activation.

FIG. 4 is a communication event diagram setting forth the general communications involved in a set of messages, states, and events 400 consistent with an embodiment of the disclosure for providing a call-less activation for provisioning STB 125. Communication event diagram 400 depicts one possible set-up instruction from the head end controller 110 or other source to provide the STB 125 with a universal resource locator (URL) of the APS 105 to be used later. In one possible embodiment, the STB 125 receives a message 402 via a broadcast message to all STBs. Also possible is a programming instruction provided as part of a build of the STB. Thus, the STB contains APS URL information.

Communication event diagram 400 may begin at state 405 where the user may connect STB 125 to the content delivery network 115 and power up STB 125. In response, STB 125 may hunt for and lock onto a frequency containing a configuration message. Next, state 405 may advance to state 410 where STB 125 may receive a code upgrade if the code for STB 125 has been upgraded. After the code upgrade at state 410, state 410 may continue to state 415 where STB 125 may cause an activation support message (ASM) to be output for display on monitor or display 130. While displaying the ASM, STB 125 may also display indicia 205. The indicia represent content locally generated that identify the STB (for example MAC address) and content received via the network delivery system concerning the URL of APS applicable to all STBs connected to the same headend controller. For example, indicia 205 may contain a Web URL to APS 105 and the MAC address of STB 125 being provisioned. The ASM message may instruct the user to either call an operator of the content delivery system or to use an application (e.g., software) on companion device 140 to scan indicia 205 for activation.

After STB 125 causes the activation support message (ASM) to be displayed on display 130, the user may cause the application in companion device 140 to scan the displayed indicia 205 from display 130 at state 420. From the scanned indicia 205, the application in companion device 140 may extract, for example, a Web URL of APS 105. With the extracted Web URL of APS 105, companion device 140 may send an activation request to APS 105 at state 425. In one embodiment, the connection between companion device 140 and the Activation Proxy Server 105 is a secure connection to some level to prevent theft of service. The activation request may include the MAC address of STB 125. As shown in FIG. 1, the companion device 140 transmits the ASM via link to cellular network 135. The cellular network passes the activation request 425 to the network 115 which passes the message 425 to the APS 105. Details of the cellular network to IP network 115 are not shown for clarity and are well known to those of skill in the art.

After companion device 140 sends the activation request to APS 105 at state 425, communication event 400 may continue to state 430 where APS 105 may send a message to headend controller 110 to determine if the entitlements/packages were already setup for the user of STB 125. If the entitlements/packages were already setup for the user of STB 125, this may indicate that only entitlement re-send may be needed to activate the STB 125. If the entitlements were already setup at state 435, APS 105 may request headend controller 110 to re-send the entitlements to STB 125 (e.g., at its MAC address). Once STB 125 receives the entitlements from headend controller 110 at state 440, STB 125 may be activated at state 445 and enabled to play content from the content delivery system.

However, if the entitlements were not already setup, headend controller 110 may direct a message to STB 125 at state 455 to update the indicia 205 to be output (displayed) on display 130. The message may also cause STB 125 to update indicia 205 and present it in a new location in the display. This new location can assist in alerting the user to take notice of the updated indicia. Another alert associated with the update of the indicia 205 may be an audio alert tone(s) or an audible message to direct the user to scan the updated indicia. Thus, if the entitlements were not already set up, the APS 105 may request headend controller 110 to send a directed message to inform STB 125 at event 450 to update the activation support message and generate an updated indicia 205 with the URL of SPS 145 at message event 455. The updated indicia 205 is a new activation support message displayed on display 130 having optional user alerts including a new location and audio notification. The updated indicia is presented on display 130 at event 460.

After STB 125 causes the activation support message (ASM) to be updated on display 130, the user may cause the application in companion device 140 to scan the updated indicia 205 from display 130 at state 465. On scanning the indicia, the application on the companion device 140 may open a form to on companion device 140 to request the user to subscribe for interested packages at state 470.

The user may select the desired packages and submit the subscribed package list to the SPS 145 at state 475. The SPS 145 shall inform the headend controller 110 to install an entitlement management message (EMM) for the STB MAC with the subscribed packages at state 480. At event 485, the SPS 145 may inform the headend controller 110 to send the EMMs containing the entitlements necessary to activate the STB 125.

The headend controller 110 may send entitlements to activate the STB 125 at event 490. Once STB 125 receives the entitlements from headend controller 110 at state 490, STB 125 may be activated at state 495 and is then enabled to play content from a content delivery system connected via the headend controller 110. Also, after entitlements are established, the indicia 205 is removed from the display 130 as it is no longer needed by the user.

Figure 5:
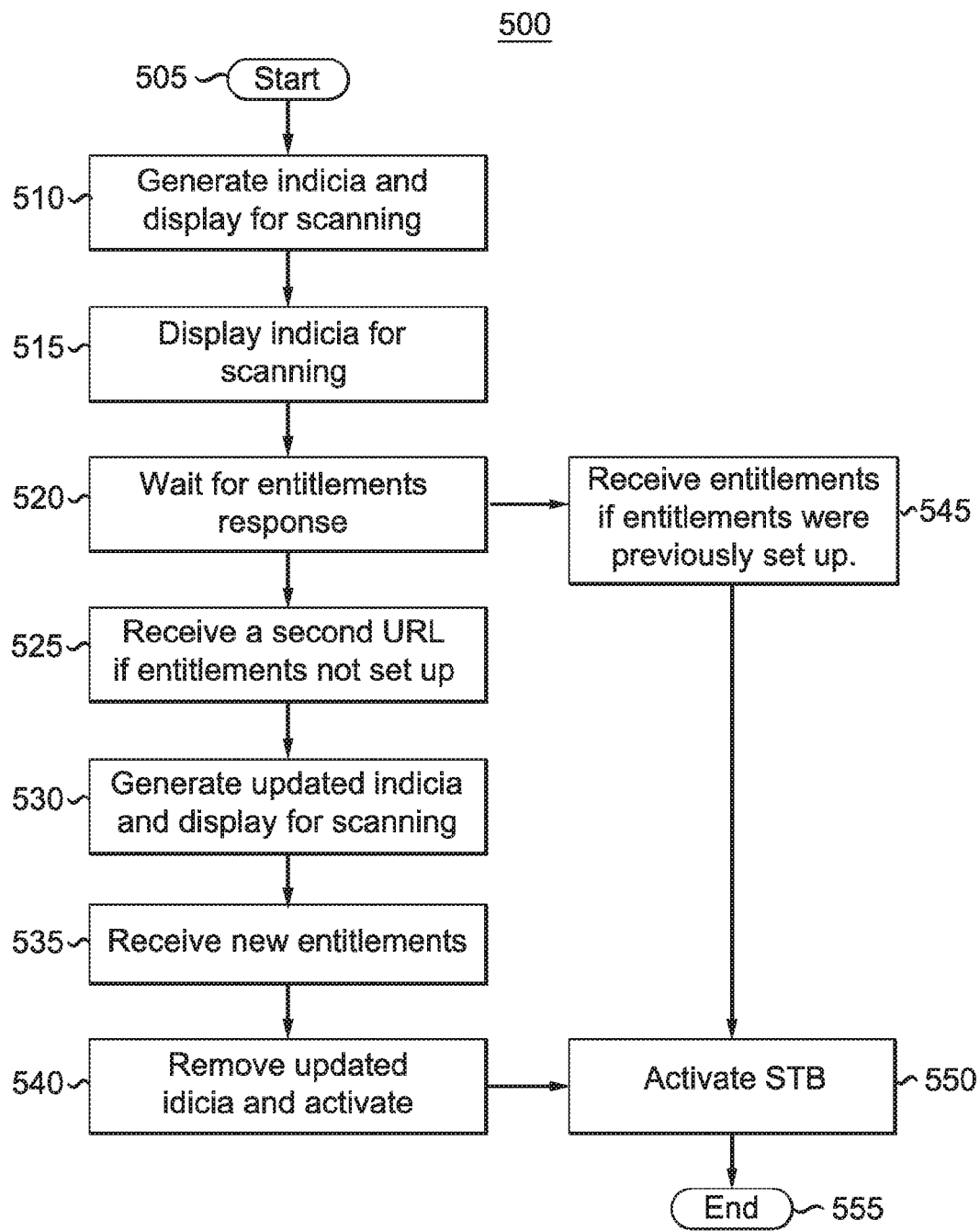
FIG. 5 is a flow diagram of an example method of the disclosure.

FIG. 5 is a flow diagram depicting an example method 500 performed by a STB supported by the current disclosure consistent with the configuration of FIG. 1. The method 500 starts at 505 with the connection of a STB to a network. At step 510, the STB generates a displayable indicia. The indicia, such as a QR code, includes a coded form of the URL for the activation proxy server (APS) 105 and the MAC address of the STB. At step 515 the indicia is displayed, for example on monitor 130, as part of a activation support message (ASM). The indicia may be part of the ASM or be the entire ASM itself.

At step 520, the STB waits for a response to the display of the indicia 205. Referring to FIG. 4, this occurs from the STB point of view after the STB drives the display 130 with the indicia at event 415. At step 545 of FIG. 5, if entitlements were already set up, then entitlements are received by the STB. Step 545 corresponds to event 440 of FIG. 4, where entitlements are sent to the STB if the entitlements are already set up. Following step 545, step 550 is entered where activation of the STB can occur. The process ends at step 555.

However, if entitlements were not already set up, then instead of receiving entitlements at step 545, the STB instead receives a second URL at step 525. Step 525 corresponds to event 455 of FIG. 4 where the STB receives a message to update the indicia (QR code) with the subscription proxy server SPS 145 URL instead of the APS 105 URL. At step 530, the STB updates the indicia with the SPS URL and the MAC address of the STB. At step 535 the STB drives a display (such as monitor 130) with the updated indicia. This makes the updated indicia (an updated indicia 205) available for scanning by a companion device. Step 535 corresponds to event 460 of FIG. 4. There, the STB waits for the new entitlements to be received at event 490. Likewise on FIG. 5, the new entitlements are received at step 535. After new entitlements are received, the updated indicia is removed at step 540 and the STB is activated at step 550. Once activated, the method 500 ends.

Figure 6:
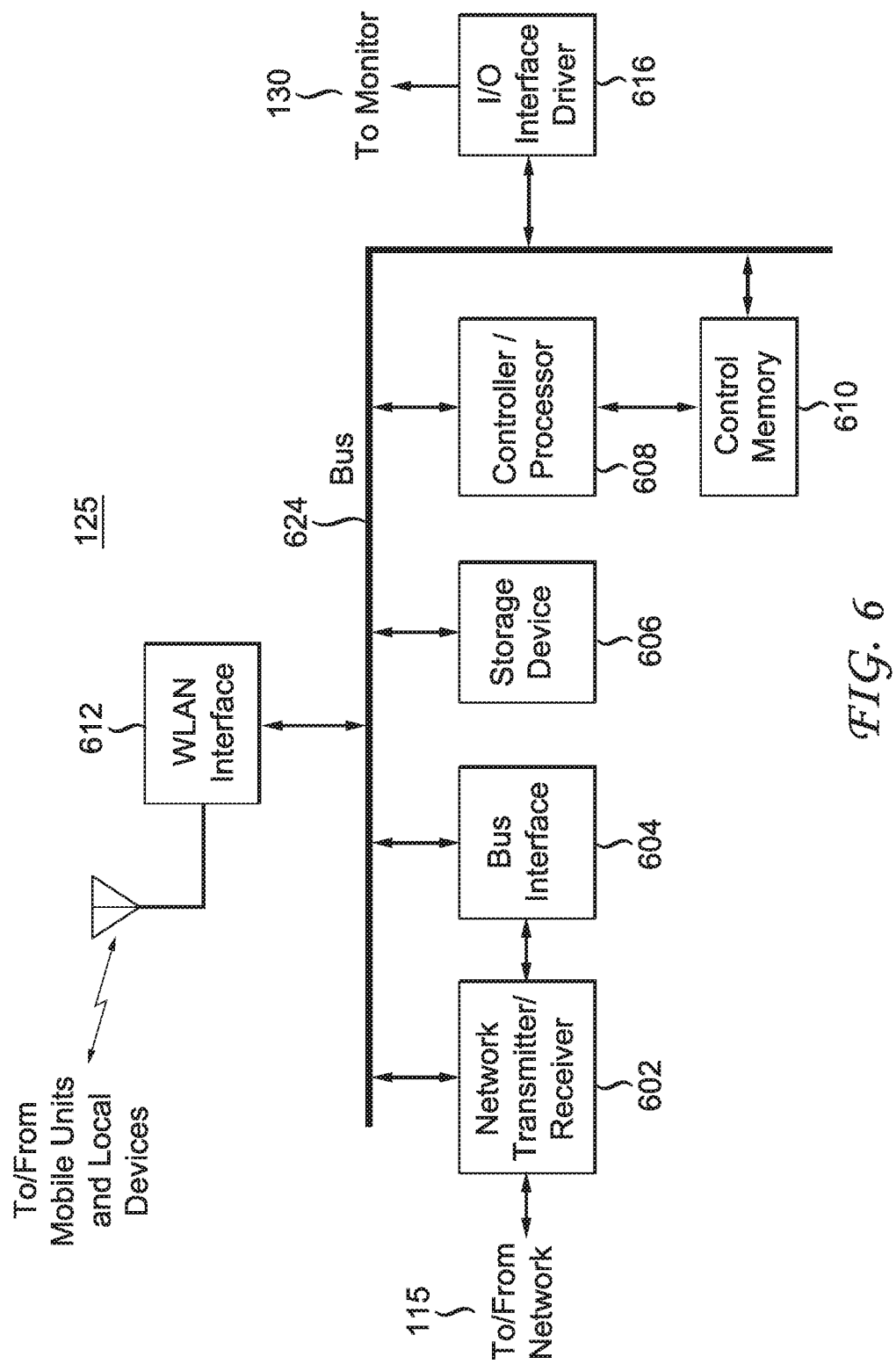
FIG. 6 is a block diagram of an example set-top-box used in the disclosed environment.

FIG. 6 is another example embodiment of a STB, such as that shown in FIG. 1, item 125. Here, a connection to a network 115 is via the network transmitter/receiver interface 602. The network 115 connection referred to here may include a connection to the internet or other resources which may include servers, remote or cloud memory, or other possible network services. The network interface 602 connects to the bus interface 604 which allows access to the internal bus 624. Other, non-bus, implementations are also possible as is well known to those of skill in the art. Present on bus 624 are a storage device 606 which can be used for any general storage such as retrieved or requested data and network management data, parameters, and programs. Such network management and other programs are under the control of controller/processor 608.

This controller/processor 608 may be a single processor or a multiplicity of processors performing the tasks of network management, user interface control, and resource managements. Control memory 610 can supply program instruction and configuration control for controller/processor 608. Input/output (I/O) interface driver 616 allows the STB 125 to drive monitor 130. The STB 125 can communicate with mobile devices and other devices in a home via a protocol driven interface, such as IEEE 802.11 and the like using wireless local area network (WLAN) interface 612. This WLAN interface is shown to provide an alternate interface to that of monitor driver 616 to indicate the flexibility of an STB in transmitting information for activation. In one embodiment, the activation method 500 may be conducted using a wireless LAN interface to a remote monitor or mobile device display instead of using wired monitor 130 to display the above-described indicia.

The controller/processor 608 of the STB 125 of FIG. 6 is configured to provide processing services for the steps of the methods of FIG. 5. For example, the controller processor can provide instruction control to monitor and control the interfaces of the network transmitter/receiver 602, the I/O driver interface 616, and the WLAN interface 612. Controller/processor 608 directs the flow of information through STB 125 such that the STB activities of event flow diagram FIG. 4 are performed as well as the method of FIG. 5. It is the processor or controller 608 which drives the interface of FIG. 6 to interact with the companion device 140 for scanning of the indicia 205.

Accordingly, embodiments of the disclosure may provide a way of activating a STB (e.g., a one-way STB) during installation. With conventional systems, the STB may display the ASM to the user asking the user to call the service provider call center to do the activation. In the case of a two-way STB, provisioning may be done using a self-install mode where the two-way STB pulls entitlements from the headend controller during installation. Because a one-way STB does not have reverse path communication, self-install is not possible with conventional systems. In such an instance and without the inventive aspects of the present disclosure, the user would have to make a telephone call to the service provider to activate his/her STB.

Embodiments of the disclosure, however, may automate the one-way STB provisioning process. For example, embodiments of the disclosure may add an indicia (e.g., QR code) to the ASM. The indicia may be scanned via an application on a companion device that then communicates with the APS and triggers sending entitlements. Embodiments of the disclosure may have the benefit of reduced telephone call-center costs by automating activation and provisioning of a one-way STB.

In addition, embodiments of the disclosure provide the user an opportunity to avoid using a telephone to contact a call-center for STB activation in the event that embodiments are not already available for the STB. If entitlements have not been set up, then the user is presented with an updated indicia (e.g. QR code) to the ASM. This updated indicia may be scanned with a companion device that then communicates with a SPS to initiate a transfer of information between the user and the SPS to initiate a set of entitlements being sent to the STB. Without the updated indicia, the user would have no choice but to use a call-center telephone call to acquire entitlements to activate the STB.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present disclosure may be embodied in hardware, software (including firmware, resident software, micro-code, etc.), or a combination of hardware and software. Embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The invention claimed is:

1. A method performed by a set-top box, the method comprising:
    generating an indicia containing a media access control address of the set-top box and a first uniform resource locator, the set-top box operating on a first network;
    outputting the indicia for display, wherein the indicia is presented to be scanned by an external device to communicate on a second network to obtain entitlements for the set-top box;
    receiving a second uniform resource locator if the entitlements were not previously granted;
    generating an updated indicia containing the media access control address of the set-top box and the second uniform resource locator;
    outputting the updated indicia for display, wherein the updated indicia is presented to be scanned by the external device on the second network for initiation of a subscription having entitlements used for activation of the set-top box;
    receiving entitlements via the first network for activation of the set-top box after initiation of the subscription occurs; and
    activating the set-top box using the entitlements to receive multimedia content from the first network.

2. The method of claim 1, wherein generating an indicia comprises generating an indicia having a web address of an activation proxy server, and generating an updated indicia comprises generating an indicia having a web address of a subscription proxy server.

3. The method of claim 1, further comprising removing the indicia from being displayed when the updated indicia is output for display.

4. The method of claim 1, wherein the updated indicia is output for display in a location different than the indicia.

5. The method of claim 1, wherein the indicia and the updated indicia are one of the group of a one-dimensional bar code, a two-dimensional bar code, a Maxicode, a high capacity color barcode, and a quick response code.

6. The method of claim 1, wherein receiving a second uniform resource locator if the entitlements were not previously granted comprises receiving a message from a headend controller containing the second uniform resource locator.

7. The method of claim 1, wherein receiving entitlements for activation of the set-top box if initiation of the subscription occurs comprises receiving entitlements from a headend server.

8. A method performed by a mobile device, the method comprising:
    scanning, using the mobile device, an indicia being displayed on a display device;

extracting data from the indicia using the mobile device, the extracted data including a first uniform resource locator and a media access controller address of associated with a set-top box;
communicating, using the mobile device, across a mobile network using the extracted data;
if the set-top box cannot acquire entitlements over an internet protocol network based on the communication of the mobile device, scanning, using the mobile device, an updated indicia displayed on the display device;
extracting updated data from the updated indicia using the mobile device, the extracted updated data including a second uniform resource locator and a media access controller address of the set-top box;
communicating, using the mobile device, across the mobile network using the extracted updated data;
receiving, using the mobile device, a subscriber form for multimedia content, the subscriber form to be populated with subscriber information;
transmitting, using the mobile device, the populated subscriber form across the mobile network to the second uniform resource locator address;
wherein the set-top box is supplied with entitlements via the internet protocol network based on the populated subscriber form transmitted over the mobile network.

9. The method of claim 8, wherein scanning an indicia being displayed on a display device comprises optically scanning one of the group of a one-dimensional bar code, a two-dimensional bar code, a Maxicode, a high capacity color barcode, and a quick response code from a display driven by the set-top box using a camera of the mobile device.

10. The method of claim 8, wherein extracting data from the indicia and extracting data from the updated indicia comprises processing the indicia and updated indicia using an application of the mobile device to interpret the scanned indicia and scanned updated indicia.

11. The method of claim 8, wherein communicating across the mobile network using the extracted data comprises transmitting, by the mobile device, an activation request to the first uniform resource locator address.

12. The method of claim 8, wherein communicating across the mobile network using the extracted updated data comprises transmitting, by the mobile device, a subscription request to the second uniform resource locator.

13. The method of claim 8, wherein receiving a subscriber form for multimedia content, the subscriber form to be populated with subscriber information comprises receiving a format for submitting subscriber information from a subscription proxy server.

14. The method of claim 8, wherein transmitting the populated subscriber form across the mobile network to the second uniform resource locator address comprises transmitting over the mobile network the populated subscriber form to a subscription proxy server on the internet protocol network to initiate a subscription with a service provider located on the internet protocol network.

15. An apparatus comprising:
a processor, wherein the processor generates an indicia containing a media access control address of the apparatus and a first uniform resource locator;
an output interface driving the indicia to be displayed, wherein the indicia is presented to be scanned by an external device to communicate on a second network to obtain entitlements for the set-top box if entitlements were previously granted;
a network transceiver to receive a second uniform resource locator if the entitlements were not previously granted;
the processor generating an updated indicia containing the media access control address of the apparatus and the second uniform resource locator;
the output interface driving the updated indicia to be displayed, wherein the updated indicia is presented to be scanned by the external device on the second network for initiation of a subscription having entitlements used for activation of the set-top box;
the network transceiver receiving entitlements for activation of the set-top box after initiation of the subscription occurs; and
the processor activating the apparatus using the entitlements to receive multimedia content from the first network.

16. The apparatus of claim 15, wherein the processor generates an indicia having a web address of an activation proxy server, and the processor generates an updated indicia having a web address of a subscription proxy server.

17. The apparatus of claim 15, wherein the network transceiver receives a message from a headend controller containing the second uniform resource locator.

18. An apparatus comprising:
a camera for scanning an indicia being displayed on a display device;
a processor for extracting data from the indicia, the extracted data including a first uniform resource locator and a media access controller address associated with a set-top box;
a transceiver for communicating across the mobile network using the extracted data;
the processor determines if the set-top box cannot acquire entitlements over an internet protocol network based on the extracted data;
the camera scans an updated indicia displayed on the display device;
the processor extracts updated data from the updated indicia, the extracted updated data including a second uniform resource locator and a media access controller address of the set-top box;
the transceiver communicating across the mobile network using the extracted updated data;
the transceiver receiving a subscriber form for multimedia content, the subscriber form to be populated with subscriber information;
the transceiver transmitting the populated subscriber form across the mobile network to the second uniform resource locator address, wherein the set-top box is supplied with entitlements via the internet protocol network based on the populated subscriber form transmitted over the mobile network.

19. The apparatus of claim 17, wherein the transceiver transmits the populated subscriber form across a mobile network to a subscription proxy server on the internet protocol network to initiate a subscription with a service provider located on the internet protocol network.

* * * * *